US006262207B1

(12) United States Patent
Rao et al.

(10) Patent No.: US 6,262,207 B1
(45) Date of Patent: Jul. 17, 2001

(54) ABN DISPERSANTS FOR HYDROPHOBIC PARTICLES IN WATER-BASED SYSTEMS

(75) Inventors: Prabhakara Satyauolu Rao, Maplewood; Ahmed Salih Abuelyaman; Babu N. Gaddam, both of Woodbury, all of MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 09/216,161

(22) Filed: Dec. 18, 1998

(51) Int. Cl.$^7$ ............................ C08F 2/38; C08L 41/00; C09D 11/10
(52) U.S. Cl. ........................ 526/224; 523/160; 523/161; 525/212
(58) Field of Search .................. 523/160, 161; 526/222, 224; 525/212, 218

(56) References Cited

U.S. PATENT DOCUMENTS

| | | | |
|---|---|---|---|
| 3,960,824 | * 6/1976 | Hicks | 526/85 |
| 4,032,698 | * 6/1977 | Ashe | 525/126 |
| 4,507,466 | 3/1985 | Tomalia et al. | 528/332 |
| 4,558,120 | 12/1985 | Tomalia et al. | 528/363 |
| 4,568,737 | 2/1986 | Tomalia et al. | 528/332 |
| 4,587,329 | 5/1986 | Tomalia et al. | 528/363 |
| 4,597,794 | 7/1986 | Ohta et al. | 106/20 |
| 4,631,337 | 12/1986 | Tomalia et al. | 528/391 |
| 4,694,064 | 9/1987 | Tomalia et al. | 528/332 |
| 4,713,975 | 12/1987 | Tomalia et al. | 73/865.8 |
| 4,737,550 | 4/1988 | Tomalia | 525/418 |
| 4,857,599 | 8/1989 | Tomalia et al. | 525/259 |
| 4,871,779 | 10/1989 | Killat et al. | 521/28 |
| 4,912,169 | * 3/1990 | Whitmire et al. | 525/221 |
| 4,942,213 | * 7/1990 | Haubennestel et al. | 528/28 |
| 5,085,698 | 2/1992 | Ma et al. | 106/20 |
| 5,098,475 | 3/1992 | Winnik et al. | 106/23 |
| 5,120,361 | 6/1992 | Winnik et al. | 106/22 |
| 5,125,968 | 6/1992 | Takimoto et al. | 106/20 |
| 5,169,436 | 12/1992 | Matrick | 106/20 D |
| 5,184,148 | 2/1993 | Suga et al. | 346/1.1 |
| 5,254,159 | 10/1993 | Gundlach et al. | 106/22 H |
| 5,256,193 | 10/1993 | Winnik et al. | 106/21 A |
| 5,266,106 | 11/1993 | Winnik et al. | 106/22 K |
| 5,310,778 | * 5/1994 | Shor et al. | 524/556 |
| 5,349,030 | * 9/1994 | Long, II et al. | 525/450 |
| 5,354,800 | * 10/1994 | Suzuki et al. | 524/460 |
| 5,418,301 | 5/1995 | Hult et al. | 525/437 |
| 5,545,504 | 8/1996 | Keoshkerian et al. | 430/137 |
| 5,554,213 | 9/1996 | Radigan, Jr. et al. | 106/22 H |
| 5,574,117 | * 11/1996 | Yoshida et al. | 526/224 |
| 5,596,027 | 1/1997 | Mead et al. | 523/161 |
| 5,679,762 | * 10/1997 | Yoshida et al. | 528/364 |
| 5,714,632 | 2/1998 | Rao et al. | 562/450 |
| 5,731,095 | 3/1998 | Milco et al. | 428/482 |
| 5,777,129 | 7/1998 | Juneau et al. | 548/455 |
| 5,780,551 | 7/1998 | Engel et al. | 525/236 |
| 5,788,749 | 8/1998 | Breton et al. | 106/31.6 |
| 5,807,971 | 9/1998 | Gozzini et al. | 528/332 |
| 5,821,283 | * 10/1998 | Hesler et al. | 523/161 |
| 5,830,948 | 11/1998 | Frechet et al. | 525/410 |
| 5,837,045 | 11/1998 | Johnson et al. | 106/31.85 |
| 5,840,106 | 11/1998 | Krepski et al. | 106/20 R |
| 5,851,274 | 12/1998 | Lin | 106/31.43 |
| 5,938,830 | * 8/1999 | Kuo et al. | 106/31.75 |

FOREIGN PATENT DOCUMENTS

| | | |
|---|---|---|
| 0 722 994 A1 | 7/1996 | (EP) . |
| WO 96/14925 | 5/1996 | (WO) . |
| WO 97/43351 A1 | 11/1997 | (WO) . |
| WO 97/49774 A2 | 12/1997 | (WO) . |

OTHER PUBLICATIONS

Perstorp Polyols Bulletin, p.1, Jun. 1994.
Malmstrom, E., Johansson, M., and Hult, A., "Hyperbranched Aliphatic Polyesters", *Macromolecules*, vol. 28, No. 5, (Feb. 27, 1995), pp. 1698–1703.
Spinelli, H. J., "Polymeric Dispersants in Ink Jet Technology", *Advanced Materials*, vol. 10, No. 15, (1998), pp.1215–1218.

* cited by examiner

*Primary Examiner*—Vasu Jagannathan
*Assistant Examiner*—Callie E. Shosho
(74) *Attorney, Agent, or Firm*—Melanie Gover

(57) ABSTRACT

Dispersants that strongly adsorb to hydrophobic surfaces of particles in aqueous media are described. The dispersants comprise a hydrophilic or amphiphilic polymer chain containing ionizable moieties and having a terminal forked hydrophobic segment. Suspensions and inks comprising the dispersants are also described.

26 Claims, No Drawings

ABN DISPERSANTS FOR HYDROPHOBIC PARTICLES IN WATER-BASED SYSTEMS

FIELD OF THE INVENTION

The present invention relates to dispersants for hydrophobic particles including pigments in water-based systems. In particular, the inventive dispersant can be used with pigments such as those useful for inks adapted for ink jet printing applications.

BACKGROUND OF THE INVENTION

When hydrophobic particles are placed in water they tend to agglomerate. This tendency makes it difficult to obtain a dispersion of hydrophobic particles in a water-based system. To lessen this agglomeration tendency, a dispersant may be added to the mixture. If the dispersant is both hydrophobic and hydrophilic its hydrophobic part will be attracted to the hydrophobic particle surface and the hydrophilic part will be solvated by the water.

In recent years, the use of thermal ink jet printers in numerous applications has increased dramatically. Such printers use liquid-based inks, which are sprayed onto a receptor, typically a sheet of paper or film, to produce an image. By using basic ink colors (black, yellow, cyan, and magenta, or black, red, green and blue) as well as white pigments (such as $TiO_2$) in various combinations and concentrations, virtually any color may be produced as part of the printed image. Additionally, ink jet technology is well-suited for high resolution graphic images, particularly those produced using electronic printing systems. Such systems typically employ computer technology to create, modify, and store images, text, graphics and the like.

Many of the inks that have been used in the past with ink jet and other printers are primarily comprised of dyes contained within organic-based carrier liquids. Although such inks may offer satisfactory performance in certain applications, the present trend is away from such systems, because such systems tend to produce images that lack the light stability and durability required for outdoor and similarly demanding applications. Additionally, the use of organic-based carrier liquids creates numerous environmental and material-handling complications. Rather, the printing industry has sought inks that are primarily water-based to thereby reduce or eliminate the problems associated with organic solvent-based systems.

Inks may comprise a suspension of pigment particles in a water-based carrier. However, the suspended pigments may tend to agglomerate. Because ink jet printers use very small jet nozzles (on the order of less than about 40 micrometers with droplet volumes on the order of picoliters) to provide high resolution images, pigment agglomerations may restrict or clog the printer heads. This effect is referred to herein as "plugging." Additionally, in the case of thermal inkjet systems, the ink is subjected to high temperatures (approximately 350° C.) as a result of the heating element in the nozzle. Typically inks tend to agglomerate at a faster rate at higher temperatures, and may also settle onto, and coat, the heating elements of the printer heads. This causes decreased thermal efficiency of the print head which results in the formation of smaller ink droplets and lower image quality. This effect is commonly referred to as "kogation."

To overcome the problems described above, some pigment particles have been stabilized (from agglomeration) with dispersants. In one approach, the dispersants were formed from surfactants having a hydrophilic portion and a hydrophobic portion, which hydrophobic segment adsorbed onto pigment surfaces of varying hydrophobicity. In another approach, copolymers having hydrophilic and hydrophobic segments were used. Examples of these approaches are described in U.S. Pat. No. 4,597,794 and U.S. Pat. No. 5,085,698.

In the approaches described above, the hydrophobic segments of the surfactant or polymer can adsorb onto pigments by hydrophobic interaction between the dispersant molecule and the organic-based pigments whose surfaces tend to be hydrophobic. This hydrophobic interaction is usually not very strong. Because of this weak attraction, the dispersant molecules may desorb from the pigment surface, thereby allowing the pigment particles to agglomerate. During printing, this can result in plugging of the printer head jet nozzles. Although heat produced in a thermal inkjet system may strengthen the adsorption of the dispersant on the hydrophobic pigment surface, thus enhancing the stability of the ink, plugging and kogation remain a problem.

SUMMARY OF THE INVENTION

In view of the foregoing, a need exists for dispersants that strongly adsorb to hydrophobic particles in aqueous media and that inhibit agglomeration. A need also exists for water-based inks that offer increased stability. The present invention addresses such needs.

One aspect of the invention provides a dispersant for dispersing hydrophobic particles in an aqueous system comprising an $AB_n$ structure wherein A is a hydrophilic polymeric segment containing ionizable moieties and is terminated with a multifinctional chain transfer agent (CTA), B is a nonpolar nonpolymerized hydrocarbon hydrophobic moiety, n is greater than one, and the B moieties form a forked segment at the CTA-terminated end of the A segment. The presence of multiple hydrophobic moieties can enhance the dispersant's interaction with particle surfaces.

Another embodiment of the invention relates to stable water-based systems in which the inventive dispersant is incorporated into a water-based dispersion of particles, the particles having hydrophobic surfaces. Such systems comprise an aqueous suspension of a) hydrophobic particles, and b) a dispersant comprising an $AB_n$ structure wherein A is a hydrophilic polymeric segment containing ionizable moieties and is terminated with a multifinctional chain transfer agent (CTA), B is a nonpolar nonpolymerized hydrocarbon hydrophobic moiety, n is greater than one, and the B moieties form a forked segment at the CTA-terminated end of the A segment.

A particular application of the present invention relates to stable water-based pigmented inks that meet the stringent requirements of ink jet and other printing applications. In these inks, an inventive dispersant is incorporated into a water-based pigment dispersion to eliminate or reduce the likelihood that the hydrophobic pigment particles will agglomerate.

As used in this invention:

"adsorb" refers to the adherence of an atom, ion, or molecule to the surface of another substance;

"dispersant/particle composite" means a dispersant molecule and the particle or particulate to which the dispersant is adsorbed; typically the composite will comprise layers of dispersant molecules with the hydrophobic particle;

"ionizable" means a neutral molecule comprising atoms capable of losing or gaining electrons, thereby acquiring a net electrical charge and becoming an ion, e.g., when placed in a polar medium such as water, "forked" means having two or more hydrophobic moieties extending from the CTA-terminated end of the hydrophilic segment; the hydrophobic moieties may extend in different direction and are preferably able to move sufficiently to allow individual moieties of the dispersant molecule to adsorb to a location on a particle surface independent of the adsorption location of another moiety of the same dispersant molecule;

"hydrophilic polymeric segment" or "hydrophilic polymeric chain," or "amphiphilic polymer (chain)" means a the portion of the dispersant, distinct from the hydrophobic segment, that is comprised of at least 60 weight % water-soluble monomer units and has at least one ionizable monomeric component;

"oligomer" means a polymer chain having approximately 10 to 50 monomer units;

"aliphatic group" or "aliphatic moiety" or "long chain aliphatic group" or "long chain aliphatic moiety" means a linear, branched, or cyclic, substituted or unsubstituted nonpolar hydrocarbon having approximately 6 to 100, preferably 8 to 20, carbon atoms;

"aromatic group" or "aromatic moiety" means a nonpolar hydrocarbon, having approximately 6 to 100, preferably 8 to 20, carbon atoms, comprising at least one cyclic structure containing at least one π-conjugated ring structure;

"hydrocarbon group" or "hydrocarbon moiety" means an aliphatic or aromatic group or moiety;

"banding" refers to visible striations or lines of lower optical density that can occur when an ink is printed on a substrate;

"random copolymer" means a copolymer comprised of at least two types of monomer units, e.g., A and B, wherein the order of a combination of monomeric units is random;

"hydrophobic segment" means the portion of a dispersant molecule, distinct from the hydrophilic segment, comprised of water-insoluble, nonpolar moieties that can associate or bond with the surface of a hydrophobic particle; the hydrophobic segment is not polymerized but rather each hydrophobic moiety (B moiety) is derived from a single aliphatic or aromatic hydrocarbon precursor;

"hydrophobic particle" means a particle that is nonpolar or has a nonpolar surface;

"solvate" refers to the phenomenon wherein a strong affinity of a solvent, e.g., water, for particles of dissolved or suspended substances leads to the particles acquiring a tightly held film of solvent on their surfaces;

"water soluble" refers to a material capable of being homogeneously distributed in water, such as a material that will form an aqueous solution or dispersion.

Further aspects of the invention will become apparent with reference to the following detailed description.

DETAILED DESCRIPTION

The dispersants of the present invention may be the reaction products of hydrophilic or amphiphilic polymers, including oligomers and copolymers, containing ionizable moieties; multifunctional chain transfer agents (CTA); and nonpolar nonpolymerized hydrocarbon hydrophobic moieties containing at least one reactive group that can react with the functional group(s) of the CTA, which hydrophobic moieties can adsorb to a particle having a hydrophobic surface. Although the dispersants contain water-insoluble segments and moieties, the dispersants are water-soluble, i.e., they will form aqueous dispersions.

When added to a dispersion system, the ionizable hydrophilic segment of the dispersant, which segment can be of variable length, is believed to provide steric and electrostatic stabilization to the dispersion while the multiple hydrophobic moieties provide strong hydrophobic adsorption (anchoring) of the dispersant to the hydrophobic particle surface.

The steric and electrostatic stabilization provided by the hydrophilic segment results from a strong mutual repulsion between individual dispersant/particle composites. These repulsive forces are due to the hydrophilic segment containing ionic functional groups, which cause each dispersant/particle composite to become effectively highly charged. The ionic groups can be anionic or cationic, but typically should all have the same type of charge. The like charges cause the composites to repel each other, thereby inhibiting particle flocculation. As discussed above, resistance to particle flocculation is desired to counteract the high thermal energy generated during jetting, which energy can cause frequent and energetic particle interactions, leading to flocculation. Reduction of particle flocculation is further desired because flocculation can decrease ink dispersion stability and shelf-life. The repulsive forces can help provide dispersion stability for an extended period of time, e.g., at least one year.

The hydrophilic (co)polymers may be linear or branched, preferably linear, and may comprise any hydrophilic, ionizable monomeric component including, e.g. acrylic acid (AA), 2-acrylamido-2-methyl-1-propanesulforic acid (AMPS), itaconic acid, and anhydrides such as maleic anhydride, and itaconic anhydride. Copolymers may be amphiphilic by optionally comprising neutral/non-ionizable monomers including, e.g., isobomyl acrylate (IBA), isooctyl acrylate, and alkyl acrylates such as ethyl-, butyl-, and isobutyl-acrylates, and styrene. To ensure that the dispersant will be water soluble, the content of water-insoluble, non-ionizable monomers, such as IBA, in the A segment preferably does not exceed 40 weight % of the A segment or the dispersant. The monomer units of the copolymers of the hydrophilic segment are randomly ordered.

The chain transfer agent (CTA) effectively attaches terminal functional groups to the hydrophilic segment. The CTA controls the length of the hydrophilic segment and provides the functional reactive sites for attachment of hydrophobic moieties, which moieties can adsorb to hydrophobic particles. For example, the CTA may contain mercapto groups, which will terminate the hydrophilic polymer chain, and hydroxyl functional groups, which will provide reaction sites for attaching the hydrophobic moieties. The number of functional sites on the CTA will govern the number of hydrophobic moieties on the dispersant. The amount of CTA reacted with the hydrophilic segment reactants may be varied to alter the length of the hydrophilic segment. Increasing the concentration of CTA will cause a shorter chain length. The CTA may be, eg., a mercaptopolycarboxylic acid, such as mercaptosuccinic acid, a mercaptopolyol, a halopolyol, or any other moiety that can terminate the hydrophilic segment and provide two or more reaction sites for the hydrophobic moieties of the hydrophobic segment.

The hydrophobic moieties comprise nonpolar hydrocarbon groups containing approximately 6 to 100, preferably 8 to 20, total carbon atoms per group. The hydrocarbon group may be an aliphatic group that is linear or branched, unsubstituted or substituted, as long as the substituent does not contain a polar moiety, or the hydrocarbon group may be aromatic.

Each of the hydrophobic moieties in the dispersant permits hydrophobic interaction of the dispersant with hydrophobic surfaces. In general, the degree of possible hydrophobic interaction between the dispersant and hydrophobic particles depends on the number of hydrophobic moieties in each dispersant molecule available to spread on the surface of each hydrophobic particle.

The hydrophobic moieties may be selected to tailor the physico-chemical properties of the resulting dispersant to provide the most effective dispersant for the particular dispersion to be stabilized. The number of hydrophobic moieties on the dispersant molecule may be controlled and chosen to maximize particle adsorption without compromising water solubility of the dispersant. Factors to consider include the solubility of the dispersant in the particular water-based carrier liquid and the chemical nature of the surface of the particle to be dispersed. The hydrophobic moieties are preferably of sufficient length to allow two or more available hydrophobic moieties, on a single dispersant molecule to adsorb to a single hydrophobic particle.

The dispersants of the invention may be prepared by polymerizing the monomer components of the hydrophilic chain in the presence of a chain transfer agent carrying reactive groups, then reacting the resulting polymers with hydrophobic moieties. The molecular weight of the dispersant is typically below 100,000, preferably below 50,000, and most preferably in the range of 15,000 to 35,000.

The design and synthesis of the dispersant will preferably produce a stable colloidal dispersion of particle/dispersant composites having diameters of less than 250 nanometer (nm), preferably less than 200 nm, and most preferably 100 to 150 nm.

The dispersant may comprise a hydrophobic moiety terminated with a reactive functional group that will form, for example, a urethane linkage with the functional group(s) on the CTA. For example, a hydrocarbon chain terminated with isocyanate functionality will react with a free hydroxyl group of a 3-mercapto-1,2-propanediol to form a urethane linkage. Stability of the dispersant may be enhanced because urethanes do not undergo hydrolysis (or other decompositions) in aqueous media, even after an extended length of time, e.g., one year.

One embodiment of the dispersant may be prepared as follows: A mixture of isobomyl acrylate (IBA) and acrylic acid(AA) is combined with 3-mercapto-1,2-propanediol (MPD) and a photoinitiator. The resulting mixture is exposed to UV light, typically 300 to 365 nm wavelength, to effect the monomer to polymer conversion. The CTA reacts with the growing polymer chain to terminate its growth, thus forming the CTA-terminated hydrophilic segment of the dispersant polymer and providing two reactive hydroxyl functional groups. Subsequently, octadecyl isocyanate is added to react with the two hydroxyls on the end of the CTA to form the forked hydrophobic segment of the dispersant polymer.

Functional groups on the reacting materials that are not directly involved in the reaction steps forming the dispersant compounds of the present invention may be further reacted to provide desired physico-chemical properties of the final dispersants. This allows for the formation of tailored dispersants.

Ink Systems:

The dispersants of the present invention have applicability as pigment dispersants in ink jet and other printing inks. The inks of the present invention may be used with numerous pigments. In particular, the inventive inks may be provided with black, cyan, yellow, magenta, red, blue, green, and white pigments. By varying the individual color densities and overlying monochrome images, it is possible to provide virtually any color on an appropriate substrate. When combined with electronic graphic image systems, virtually any image that can be created or stored electronically can be reproduced using an ink jet printer. Of course, it should be understood that the present invention is not intended to be limited to inks of the colors discussed above. Rather, inks employing any pigment or combination of pigments compatible with electronic graphic image systems may be used.

For black inks, carbon black may be used as the black pigment. The selection of carbon blacks suitable for use with the present invention is based primarily upon considerations of surface oxidation, and the degree of blackness (also called jetness) of the pigment. Carbon black, despite its surface oxidation, is at the highest end of the hydrophobic scale as measured by heat of hydration tests. Pigments that are acidic or surface-treated provide suitable interaction sites for strong dispersant adsorption. Pigments with a high degree of blackness or jetness provide a high quality printed image.

For yellow inks, the use of nickel azo yellow pigment offers several advantages. First, such pigments provide inks that are highly durable in outdoor environments. Second, such pigments contain nickel ions, which may be able to form complex bonds with the novel dispersants. Lastly, such pigments are believed to offer a high degree of thermal conductivity. As a result, if particle deposition onto a heater element does occur during the jetting process, the deposited film will not significantly reduce the heating efficiency of the ink, thereby allowing proper droplet formation.

For magenta inks, a primary consideration is lightfastness, since it is very desirable to produce graphic images that are adapted to outdoor applications. Quinacridone magenta pigment is known to have excellent lightfastness, and therefore, is one preferred magenta pigment.

For cyan inks, the considerations above, i.e., lightfastness, durability, etc., apply as well. As a variety of satisfactory properties may be found using copper phthalocyanine as a cyan pigment, inks comprising such pigments are one preferred embodiment.

Dispersant Selection: Because pigment particles are typically devoid of surface functional groups to provide anchoring points for a dispersant, a dispersant preferably comprises a hydrophobic portion to interact with the hydrophobic solid pigment surface in an aqueous environment. The dispersants of this invention can provide multiple hydrophobic moieties to interact with the pigment particles. The presence of two or more hydrophobic moieties in a dispersant molecule allows the dispersant to adsorb to a pigment particle at two or more locations. This type of configuration provides strong adsorption (anchoring) of the pigment to the dispersant.

Usually a pigment particle does not carry a single dispersant molecule, but rather multiple layers of dispersant molecules. This occurs because when a dispersant's hydrocarbon moiety adsorbs to a particle it facilitates the adsorption of a second dispersant molecule and this will continue until an equilibrium thickness of the adsorbed dispersant layer is reached.

Compatibility between the dispersant, pigment, and other components of the ink must also be considered. The dispersants used for different colored pigments that will be applied to the same receptor surface should preferably be thermodynamically miscible and should possess the same kind of ionic charge to prevent coagulation of the inks when deposited on the receptor surface.

Co-dispersant(s) may also be used to enhance the stabilizing effect of the primary dispersants.

Inks: In addition to the pigments and dispersants described above, inks preferably comprise water as a medium in which pigments may be dispersed. Such inks typically also include firther additives to provide various properties. For example, a polyol may be employed to control the drying rate of the ink. Suitable polyols include, for example, polyalkylene glycols such as polyethylene glycol and polypropylene glycol; alkylene glycols whose alkylene group has 2–6 carbon atoms, such as ethylene glycol, propylene glycol, butylene glycol, triethylene glycol, 1,2,6-hexanetriol, hexylene glycol, and diethylene glycol; glycerol; and lower alkyl ethers of polyols such as ethylene glycol monomethyl or monoethyl ether, diethylene glycol methyl or ethyl ether, and triethylene glycol monomethyl or monoethyl ether. Diethylene glycol is the most preferred polyol. A surfactant, useful for wetting the pigment and reducing the surface tension of the ink system, may be provided as well. In addition to the above, other ink additives commonly known in the art may also be used. These include, water-soluble organic cosolvents, humectants (in addition to the above-named polyols), biocides, fungicides, defoamers, corrosion inhibitors, viscosity modifiers, pH buffers, penetrants, sequestering agents, and the like.

Ink Processing: Current compounding technology for the processing of pigment dispersions employs numerous processing technologies. One such technology makes use of ultrasonic energy to achieve mixing and particle defloccu-lation. Another technology makes use of media mills, such as ball mills, sand mills or attritors. Media mills achieve acceptable pigment dispersions by subjecting the pigment mixture to high intensity microshearing and cascading, which breaks down agglomerations of the pigment particles. However, media mill processing systems often suffer from disadvantages including media wear product contamination. Additionally, if the flow rate in a media mill is raised beyond a certain level, the resulting grinding and dispersion becomes uneven, and much of the material leaves the system without being sufficiently processed.

In still another processing method, the pigment dispersion can be forced through a series of small nozzles having diameters on the order of about 150 micrometers to about 1000 micrometers. Such systems must be able to withstand very high pressures at high fluid velocities. Three different configurations for such systems may be used: a) a "wedge" configuration with orifices of decreasing diameter, b) a "wedge" configuration within which the orifices have cavitation enhancement devices, and c) an "impinging jet" configuration in which the dispersion stream is split into at least two elements, each stream is passed through an orifice to create ajet, and thejet streams are recombined by impinging them against each other. Each of these systems has been found to yield satisfactory results when processing water-based pigmented inks.

In the present invention, the pigmented ink formulations comprising the pigment, the dispersant, auxiliary surfactant, water, DEG and other additives were subjected to mixing under high shear conditions in a Hill mixer (Model #4000 Plus, AC drive), available from Hill Mixer, Inc., Paterson, N.J., which is a high speed impinging homogenizer comprising a spiral propeller with a "grapefruit style" head for greater suction through the head of the propeller. The shear mixing was done at moderate speeds, around 2000 rpm.

After dilution to a 15 to 25% solids concentrate, the ink was subjected to fine-particle grinding by an "impinging jet" process generally as described in PCT Publication WO 96/14925. The processed concentrate was typically diluted to 4% solids in a diethylene glycol/water mixture having a DEG:water ratio of 20:80 to 12.5: 87.5, preferably 12.5:87.5.

EXAMPLES

This invention may be illustrated by way of the following examples.

All materials mentioned in these examples are available from Aldrich Chemical Co., Milwaukee, Wis., unless otherwise noted.

Test Methods
Molecular Weight

The molecular weights of dispersants were determined by elution using a gel permeation chromatograph available under the trade name ULTRAHYDROGEL, from Waters Corp., Milford, Mass. Linear 1000, 500 and 250 columns were used with an elution solution comprising 0.1M Tris amine buffer (Tris hydroxymethyl amino methane) and 0.2M Li $NO_3$. The chromatograph was equipped with a Hewlett Packard 1037A refractive index detector, available from Hewlett Packard Instruments, Palo Alto, Calif. Molecular weight calculations were based on a calibration made using polyethylene glycol (PEG) and polyethylene oxide (PEO) standards of molecular weight ranges from $2.8 \times 10^5$ to 200.

Thermal Stability

All the processed inks were brought to a concentration of 4 weight % solids unless otherwise noted. The solids include the pigment, surfactant, and any other nonvolatile additives such an auxiliary dispersant The ink obtained after processing and filtration was poured into a glass vial (8.9 cm long×2.54 cm diameter), which was covered with a loosely fitting metal cap to help retain most of the liquid (12.5 weight % diethylene glycol (DEG) in water) in the ink. The vial was left undisturbed in an oven at 60 to 65° C. for 1 week (unless otherwise noted in the examples). If no solids separation occurred at 60° C., the ink was considered to be thermally stable. If visual inspection revealed no coagulation nor even a small layer of separated solids floating on the ink, the vial was transferred to a 120° C. oven and left for at least two days to see if any solid separation occurred. If the ink showed no solids separation after 2 or more days, it was considered to be highly stable.

Quality of Prints on Encad NOVAJET III Printer

The inks were printed onto a vinyl receptor sheet available under the trade name SCOTCHCAL from 3M Company, St. Paul, Minn., using a thermal inldet printer available under the trade name NOVAJET III from Encad Inc., San Diego, Calif. In preparation for printing, the printheads were cleaned, the printer was checked for leaks, and the cartridges were filled with the ink to be tested. The quality of prints was judged visually, upon repeated trials, for uniformity of color over large format blocks (30 cm×90 cm), absence of banding, and adhesion to the substrate.

Synthesis of Dispersants

Dispersant A
Bis(octadecyl isocyanato) Poly(isobomyl-co-acrylic acid)

A mixture of 250 grams (g) of isobornyl acrylate (IBA) and 250 g of acrylic acid (AA) was dissolved in 450 g of methyl ethyl ketone in a 32 oz. glass jar. Added to this mixture was 50 g of dimethyl-formamide followed by 7.5 g of 3-mercapto-1,2-propanediol (MPD) and 0.12% by weight (based on total monomer concentration) of the photoinitiator diethoxyphenylacetophenone available under the tradename KB-1 from Sartomer Co., Exton, Pa. The resulting homogeneous reaction solution was flushed for 20 minutes with nitrogen at a rate of approximately 50 to 100 bubbles per minute. Then, while nitrogen flushing continued, the reaction solution was exposed to a 300 nm UV black light source to cause polymerization. Monomer-to-polymer conversion was monitored by gravimetric analysis (drying a sample of known weight in a vacuum at 160° C., thereby causing any monomers in the sample to evaporate, then weighing the dried sample to determine the polymer content). After reaching a near 100% conversion, 40.9 g of octadecyl isocyanate (twice the mole ratio of MPD) was added to the polymeric solution, followed by 1 to 2 drops (from an eyedropper) of dibutyltin dilaurate. The polymeric solution was shaken overnight at ambient temperature. Completion of the reaction between the IBA-AA copolymer and octadecyl isocyanate was monitored by infrared spectroscopy. The reacted polymer was then isolated by neutralization of the carboxyl groups on the polymer with aqueous ammonia, followed by precipitation in acetone (2 L). The acetone was removed and the polymer was vacuum-dried at 60° C. for 3 to 4 hours then suspended in water to obtain a 25 weight % solids solution.

Dispersant B

Dispersant B was prepared in a manner similar to Dispersant A except the quantity of 3-mercapto-2-propanediol (MPD) was 10 g (instead of 7.5 g).

Dispersant C

Dispersant C was prepared in a manner similar to Dispersant A except the quantity of 3-mercapto-2-propanediol (MPD) was 10 g (instead of 7.5 g) and the monomer charge was 300 g of IBA and 200 g of AA (instead of 250 g of IBA and 250 g of AA).

Dispersant D

Dispersant D was prepared in a manner similar to Dispersant A except the quantity of MPD was 15 g (instead of 7.5 g) and the monomer charge was 300 g of IBA and 200 g of AA (instead of 250 g of IBA and 250 g of AA).

TABLE 2

Molecular Weight Data of Polyelectrolyte polymers carrying two Hydrophobes at the same end

| Dispersant | Mn | Mw | P |
| --- | --- | --- | --- |
| Dispersant A | 13,500 | 16,500 | 1.22 |
|  | (9,600) | (13,000) | (1.35) |
| Dispersant B | 12,200 | 15,000 | 1.19 |
| Dispersant C | 14,500 | 18,200 | 1.26 |

The values in the parentheses are for repeat preparation of the dispersant. Where Mn = mean number average molecular weight, Mw = mean weight average molecular weight, and P = polydispersity (Mw/Mn).

Formulations of Ink

To evaluate the efficacy of the dispersants, a generalized procedure was adopted to prepare pigmented ink. A pigment was typically dispersed in an aqueous solution of diethylene glycol (DEG) in the presence of an auxiliary surfactant and the dispersant. Usually, the pigment to dispersant weight ratio was from 3:2 to 2:1. An auxiliary surfactant was added to adjust the surface tension of the ink, assist in its jettability through the printer nozzle, and wet the receptor surface. The surfactant may also have provided added stability to the dispersion system. Hyperdispersants, designed to wet the pigment surface, were optionally included. Diethylene glycol served as a humectant.

Grinding of the Ink

The ingredients corresponding to each ink formulation, withholding approximately 10% of the quantity of water to be used, were mixed at ambient temperature and pressure under high shear conditions in a Hill mixer (model #4000 Plus, AC drive), available from Hill Mixer, Inc., Paterson, N.J., which is a high speed impingement homogenizer-mixer comprising a spiral propeller with a "grapefruit style" head for greater suction through the head from the propeller. The mixer has a motor rated at 1 horsepower (HP) with a capacity of 10,000 revolutions per minute (rpm). Propeller speeds of up to 2,000 rpm (in both forward and reverse modes) were used for grinding. The water that was withheld was used to rinse the mixer to collect any adhering ink concentrate after the grinding operation.

The resulting concentrate was preferably 15 to 20 weight % solids to avoid forming high viscosity pastes, which are difficult to grind.

Example 1 (Yellow Ink)

In a plastic container, 40 g of a nickel azo complex yellow pigment available under the trade name FANCHON Fast Y-5688 from Bayer Corporation, Rock Hill, S.C., was suspended in a mixture of 23 g of DEG and 97 g of water. 9 grams of a nonionic aromatic ethoxylate polymeric hyperdispersant available under the trade name SOLSPERSE 27000 from Zeneca Pigments and Additives, and 5 g of a non-ionic ethoxylated fatty ester surfactant available under the trade name ALKAMULS EL-620 from Rhodia, Inc., Cranbury, N.J., were added. The resulting mixture was ground in a Hill mixer for 2 hours at approximately 2000 rpm. Then 90 g of a 29 weight % solids aqueous solution of Dispersant B was added (providing approximately 26 grams of Dispersant B) and grinding was continued for another 2 hours, producing a 20 to 25 weight % solids ink concentrate.

The 20 to 25 weight % solids ink concentrate was diluted to 12 to 15% solids and subjected to fine particle grinding in an impinging jet process, generally as described in PCT Publication WO 96/14925, for 60 to 90 minutes. The diluted ink concentrate was filtered through a 0.5 to 1.0 µm filter such as a Whatman Polycap 36 HD cartridge type filter, available from Arbor Technology, Ann Arbor, and further diluted with an 80:20 weight ratio of water/ethylene glycol mixture to an approximately 4 weight % solids ink.

The particle size of the pigment particles in the ink, as measured by an N+ submicron particle analyzer, available from Coulter Corporation, Hialeah, Fla., ranged between 100 and 150 nm.

The ink was thermally stable at 60° C. and 120° C.

The ink was jetted through the printheads of an Encad NOVAJET III wide format printer onto a SCOTCHCAL receptor sheet to yield 30 cm×90 cm prints of yellow color exhibiting uniform color, no banding, and adhesion to the substrate.

Example 2 (Yellow Ink)

100 grams of FANCHON Fast Y-5688 was suspended in a mixture of 100 g of DEG and 500 g of water. 22 grams of SOLSPERSE 27000 and 10 g of ALKAMULS EL-620 were added. The resulting mixture was ground in a Hill mixer for 2 hours at approximately 2000 rpm. Then 211.4 g of a 31.5 weight % solids aqueous solution of Dispersant A was added and grinding was continued for another 2 hours. Then 155 additional grams of water were used to collect the ink (and dilute it) by rinsing the grinding equipment and collecting the rinse water. A 20 weight % solids ink concentrate was produced.

The 20 weight % solids ink concentrate was then diluted, ground in an impinging jet process, filtered, and further diluted to provide an approximately 4 weight % solids ink, as described in Example 1.

The particle size of the pigment particles in the ink, as measured by a Coulter N+ submicron particle analyzer, ranged between 100 and 150 nm.

The ink was thermally stable at 60° C. and for one day at 120° C.

The ink was jetted through the printheads of Encad NOVAJET III wide format printer onto a SCOTCHCAL receptor sheet to yield 30 cm×90 cm prints of yellow color exhibiting uniform color, no banding and adhesion to the substrate.

Example 3 (Yellow Ink)

This example incorporates a secondary co-dispersant comprising a substituted, derivatized dendritic polymer having at least one peripheral ionizable moiety and at least one peripheral hydrocarbon moiety, as disclosed in copending application U.S. Ser. No. 09/216,165, which is incorporated by reference. For this particular example, a 5-generation functionalized hyperbranched codispersant polymer was used.

200 g of a 5-Generation hyperbranched polyester polyol (OH finctionality of 128) available under the trade name BOLTORN H50 from Perstorp Polyols Inc., Toledo, OHio, and 1 weight % of p-toluenesulfonic acid were placed in a 3-neck reactor equipped with a stirrer and a nitrogen gas inlet. The reactor was heated to 140° C. until the polymer melted. See Malmstrom, E., Johansson, M., and Hult, A., *Macromolecules*, 28, 1698–1703 (1995). To the continuously stirred molten polymer was added 25 weight % (50 g) of stearic acid, which is 12–13 mole equivalents of the polymer or 10 mole % of the polymer's free hydroxyl groups. The mixture was left to react with continuous stirring and frequent addition of xylene to facilitate azeotropic water removal. A continuous nitrogen stream was blown through the reactor throughout the reaction time to facilitate the removal of the xylene/water azeotrope. After 2 hours of reaction, the nitrogen was turned off and the reactor was connected to a vacuum to remove any small molecules and volatiles. The resulting viscous brown liquid solidified as it was left to cool to room temperature. An approximately 100% yield was obtained.

150 g of the solidified stearyl derivative of the 5th generation polyester polyol from the above reaction was mixed with an equal weight of diglyme in a 3-neck flask equipped with a stirrer, condenser, and a nitrogen gas inlet. The mixture was heated to 100° C. until the solid was dissolved to form a clear solution. To the clear solution was added 63 weight % of succinic anhydride (1 equivalent of the remaining free —OH groups) followed by 2 weight %, based on total solid charge, of 1,8-diazabicyclo [5.4.0] undec-7-ene (DBU) (1–2 moles). The mixture was heated under continuous stirring at 100° C. for 36 hrs. Then the clear liquid was coagulated in excess of hexanes at ambient temperature (25° C.) The resulting yellow paste was washed several times with wann (45° C. to 50° C.) hexanes to ensure the removal of any unreacted anhydride. The resulting residue was air dried for 48 hours then further dried at 60° C. under vacuum for 24 hours. The resulting solids (the functionalized hyperbranched polymer preparation) was dissolved in water and neutralized by the addition of a sufficient amount of aqueous ammonia to react with any unreacted hydroxyl groups. A 30–40 weight % solution of the solids was thus prepared. Sufficient aqueous ammonia was added to the solution to bring the pH to 9–10.

The entire quantity of a 20 weight % ink concentrate prepared as described in Example 2 (prior to the impinging jet process) was mixed with 58.4 g of a 38 weight % solids aqueous solution of the 5-generation functionalized hyperbranched polymer. The mixture was ground in a Hill mixer for an hour at approximately 2000 rpm then diluted, ground in a jet impinging process, filtered, and further diluted to provide an approximately 4% solids solution, as described in Example 1.

The particle size of the pigment particles in the ink, as measured by a Coulter N+ submicron particle analyzer ranged between 100 and 150 nm.

The ink was thermally stable at 60° C. and 120° C. The ink remained stable at 120° C. for more than twice as long as the ink of Example 2.

The ink was jetted through the printheads of Encad NOVAJET III wide format printer onto a SCOTCHCAL receptor sheet to yield 30 cm×90 cm prints of yellow color exhibiting uniform color, no banding and adhesion to the substrate. The ink provided more uniform, consistent color when printed in a 30 cm×90cm block (as determined visually) than the ink of Example 2.

Exapmle 4 (Cyan Ink)

360 grams of a copper phthalocyanine cyan pigment available as #449-1281(36% solids presscake) from Sun Chemical Corporation, Cincinnati, Ohio was suspended in a mixture of 160 g of DEG and 700 g of water containing 22 g of an acetylenic diol/anionic surfactant blend (serving as a grinding aid/surfactant) available under the trade name SURFYNOL CT-136 from Air Products and Chemicals, Allentown, Pa. 200 grams of a 35 weight % solids aqueous solution of Dispersant C were added, and the mixture was subjected to grinding in a Hill mixer for 4 hours at a maximum speed of approximately 2000 rpm. The ink was collected by rinsing the grinder with approximately 100 mL of water.

The resulting ink concentrate was diluted, ground in a jet impinging process, filtered, and further diluted to provide an approximately 4 weight % solids ink concentrate, as described in Example 1.

The particle size of the pigment particles, as measured by a Coulter N+ submicron particle analyzer, ranged between 100 and 150 nm.

The ink was thermally stable at 60° C. and 120° C.

The ink was jetted through the printheads of Encad NOVAJET III wide format printer onto a SCOTCHCAL receptor sheet to yield 30 cm×90 cm prints of cyan color exhibiting uniform color, no banding and adhesion to the substrate.

Example 5 (Cyan Ink)

200 grams of a copper phthalocyanine cyan pigment, having its surface modified with an adsorbed polyethylene glycol-based material, available as 751-91A (54% solids presscake) from Sun Chemical was suspended in a mixture of 160 g of DEG and 1 liter of water. Twenty-one grams of a copper phthalocyanine derivative hyperdispersant available under the trade name SOLSPERSE 12000 from Zeneca Pigments and Additives, and 21 g of grinding aid/surfactant SURFYNOL CT-136 were added. The resulting mixture was subjected to grinding in a Hill mixer for 2 hours at approximately 2000 rpm. Then approximately 67.2 g of a 35.5 weight % solids aqueous solution of Dispersant C were added to the mixture and grinding was continued for 2 more hours. An ink concentrate of approximately 15 weight % solids was obtained and was subjected to fine particle grinding in an impinging jet process, filtering, and dilution to provide an approximately 4 weight % solids ink, as described in Example 1.

The particle size of the pigment particles, as measured by a Coulter N+ submicron particle analyzer, ranged between 100 and 150 nm.

The ink was thermally stable at 60° C. and 120° C.

The ink was jetted through the printheads of Encad Novajet III wide format printer onto a SCOTCHCAL receptor sheet to yield 30 cm×90 cm prints of cyan color exhibiting uniform color, no banding, and adhesion to the substrate.

Example 6 (Cyan Ink)

The procedure of Example 5 was repeated except that after Dispersant C was added and the mixture was ground for 2 hours, approximately 50 g of a 22.5 weight % solids aqueous solution (providing 11 g of solids) of a partially esterified 3-Generation hyperbranched polyol polymer (nominal MW is 3570) was added. The hyperbranched polymer was prepared in the same manner as the 5-generation hyperbranched polymer of Example 3 except the starting material was a 3-Generation polyol available as BOLTORN H30 from Perstorp Polyols, Inc. and the 25 weight % of stearic acid provided 3 to 4 mole equivalents of the polymer.

The mixture was ground in the Hill mixer for another hour. The resulting ink concentrate was subjected to an impinging jet process, filtering, and dilution to produce an approximately 4 weight % solids ink, as described in Example 1.

The particle size of the pigment particles, as measured by a Coulter N+ submicron particle analyzer, ranged between 100 and 150 nm. The ink was thermally stable at 60° C. and 120° C. The ink remained stable at 120° C. longer than the ink of Example 5, i.e., more than two days.

The ink was jetted through the printheads of Encad NOVAJET III wide format printer onto a SCOTCHCAL receptor sheet to yield 30 cm×90 cm prints of cyan color exhibiting uniform color, no banding and adhesion to the substrate.

Example 7 (Cyan Ink)

18 g of a copper phthalocyanine cyan pigment available under the trade designation 449-5050 (55% solids presscake) from Sun Chemical was suspended in a mixture of 27 g of DEG and 170 g water. 2 grams each of hyperdispersants SOLSPERSE 12000 and SOLSPERSE 27000, followed by 2 g of grinding aid/surfactant SURFYNOL CT-136 were added to the mixture. The resulting mixture was subjected to grinding in a Hill mixer for 2 hours at approximately 2000 rpm. Approximately 10 g of a 35.5 weight % solids aqueous solution of Dispersant C (providing 4 g of solids) was then added, and grinding was continued for an hour to obtain an approximately 15 weight % solids ink concentrate.

This ink concentrate was subjected to fine particle grinding in an impinging jet process, filtering and dilution to produce an approximately 4 weight % solids ink, as described in Example 1.

The particle size of the pigment particles, as measured by a Coulter N+ submicron particle analyzer, ranged between 100 and 150 mn.

The ink was thermally stable at 60° C. and 120° C.

The ink was jetted through the printheads of Encad NOVAJET III wide format printer onto a SCOTCHCAL receptor sheet to yield 30 cm×90 cm prints of cyan color exhibiting uniform color, no banding and adhesion to the substrate.

Example 8 (Magenta Ink)

405 g of quinacridone magenta pigment available under the trade name Magenta 122 Presscake 428-5024 (29.6% solids) from Sun Chemical was suspended in a mixture of 120 g of DEG and 450 g of water containing 15 g of a (dissolved) alkaryl polyether alcohol surfactant available under the trade name TRITON X-100 from Union Carbide Chemicals and Plastics Co., Gary, Ind. 202 g of a 24.7 weight % solution (49 g of solids) of Dispersant B were added. The mixture was subjected to grinding in a Hill mixer for 2 hours at approximately 2000 rpm. Then 90 g of a 30 weight % solids aqueous solution (providing 32 g of solids) of a 3-Generation hyperbranched polymer, prepared as in Example 6, was added to the mixture and the grinding was continued for another 2 hours. The resulting ink concentrate was subjected to fine particle grinding in an impinging jet process, filtered, and diluted to produce an approximately 4 weight % solids ink, as described in Example 1.

The particle size of the pigment particles, as measured by a Coulter N+ submicron particle analyzer, ranged between 100 and 150 nm.

The ink was thermally stable at 60° C. and 120° C.

The ink was jetted through the printheads of an Encad NOVAJET III wide format printer to onto a SCOTCHCAL receptor sheet yield 30 cm×90 cm prints of magenta color exhibiting uniform color, no banding and adhesion to the substrate.

Example 9 (Black Ink)

10 grams of a black pigment available under the trade name CABOT BLACK (4) from Cabot Corp., Boston, Mass., was suspended in a mixture of 28 g of DEG and 180 g water. 2 grams each of hyperdispersants SOLSPERSE 12000 and SOLSPERSE 27000, followed by 1 g of non-ionic surfactant ALKAMULS EL-620 and 90 g of a 22.5 weight % solids aqueous solution of Dispeasant D (providing 20 g of Dispersant D) were added to the mixture. The resulting mixture was ground in a Hill mixer for 30 minutes at 2000 rpm. Then 20 g of a 39 weight % solids aqueous solution (7.5 g of solids) of 3-Generation hyperbranched polymer, prepared as described in Example 6 was added to the mixture and grinding was continued for another 10 minutes.

The resulting ink concentrate was subjected to fine particle grinding in an impinging jet process, filtered and diluted to provide an approximately 4 weight % solids ink, as described in Example 1.

The particle size of the pigment particles, as measured by a Coulter N+ submicron particle analyzer, ranged between 100 and 150 nm.

The ink was subjected to, and passed, a 2-day 60° C. thermal stability test.

Example 10 (Black Ink)

Example 10 was prepared and tested in a manner similar to Example 9 except: (1) the pigment used was a black pigment available under the trade name RAVEN 12200 CARBON BLACK from Columbian Chemicals Co., Atlanta, Ga., and (2) 30 grams of Dispersant D (135 g of a 22.5 weight % solids aqueous solution) were used.

The particle size of the pigment particles, as measured by a Coulter N+ submicron particle analyzer, ranged between 100 and 150 nm.

The ink was subjected to, and passed, a 2-day 60° C. thermal stability test.

Other embodiments of the invention are within the scope of the following claims.

What is claimed is:

1. A dispersant for dispersing hydrophobic particles in an aqueous system comprising a polymer having an $AB_n$ structure wherein A is a hydrophilic polymeric segment containing ionizable moieties and is terminated with a multifunctional chain transfer agent, B is a nonpolar nonpolymerized hydrophobic hydrocarbon moiety having a single reactive group, which reacts with the chain transfer agent, n is greater than one, and the B moieties form a forked segment at the CTA-terminated end of the A segment.

2. The dispersant of claim 1 wherein A comprises a homopolymer.

3. The dispersant of claim 2 wherein the homopolymer is prepared by the polymerization of a monomer selected from the group consisting of acrylic acid, 2-acrylamido-2-methyl-1-propanesulfonic acid, NN-dimethyl acrylamide, itaconic acid, maleic anhydride.

4. The dispersant of claim 1 wherein A comprises a random copolymer.

5. The dispersant of claim 1 wherein A comprises a random copolymer having up to 40 weight % of hydrophobic nonionizable monomeric units.

6. The dispersant of claim 5 wherein the copolymers are comprised of monomeric units selected from (a) the group of water-soluble materials consisting of acrylic acid, 2-acrylamido-2-methyl-1-propanesulfonic acid, itaconic acid, and maleic anhydride, and (b) the group of water-insoluble materials consisting of isobornyl acrylate, isooctyl acrylate, ethyl acrylate, butyl acrylate, isobutyl acrylate, and styrene, wherein the group (b) monomeric units comprise up to 40 weight % of A.

7. The dispersant of claim 1 wherein the dispersant has a number average molecular weight of 15,000 to 35,000.

8. The dispersant of claim 1 wherein the ionizable moieties in A are anionic.

9. The dispersant of claim 1 wherein B comprises an octadecyl moiety.

10. The dispersant of claim 1 wherein B comprises a hydrocarbon chain having 8 to 20 carbon atoms.

11. The dispersant of claim 1 wherein the chain transfer agent comprises 3-mercapto-1,2-propanediol.

12. The dispersant of claim 1 wherein A comprises an isobornyl acrylate/acrylic acid copolymer terminated with 3-mercaptyl-1,2-propanediyl, and B comprises a $C_{18}$ hydrocarbon segment derived from octadecyl isocyanate.

13. The dispersant of claim 12 wherein the weight ratio of isobornyl acrylate to acrylic acid is from 3:2 to 1:1.

14. An aqueous suspension comprising the dispersant of claim 1 and hydrophobic particles.

15. A water-based pigmented ink comprising a suspension of:

a) pigment particles, and b) a dispersant for dispersing hydrophobic particles in aqueous systems comprising a polymer having an $AB_n$ structure wherein A is a hydrophilic polymeric segment containing ionizable moieties and is terminated with a multifunctional chain transfer agent, B is a nonpolymerized hydrophobic hydrocarbon moiety having a single reactive group, which reacts with the chain transfer agent, n is greater than one, and the B moieties form a forked segment at the CTA-terminated end of the A segment.

16. The water-based pigmented ink of claim 15 further comprising a codispersant.

17. The water-based pigmented ink of claim 16 wherein the codispersant comprises a derivatized dendritic polymer firther comprising at least one peripheral ionizable moiety and at least one peripheral nonpolar nonpolymerized hydrocarbon hydrophobic moiety.

18. The water-based pigmented ink of claim 17 wherein the derivatized dendritic polymer comprises a derivatized $3^{rd}$ or $5^{th}$ generation hyperbranched polyol.

19. The water-based pigmented ink of claim 15 wherein A comprises an isobornyl acrylate/acrylic acid copolymer terminated with 3-mercaptyl-1,2-propanediyl, and B comprises a $C_{18}$ hydrocarbon segment derived from octadecyl isocyanate.

20. The water-based pigmented ink of claim 15 wherein the dispersant comprises a urethane linkage.

21. The water-based pigmented ink of 15 wherein the pigment particles and dispersant molecules form particle/dispersant composites having diameters of less than 250 nanometers.

22. The water-based pigmented ink of claim 15 wherein the pigment is selected from the group consisting of black, yellow, magenta, cyan, red, blue, green, and white pigments.

23. The water-based pigmented ink of claim 22 wherein the black pigment comprises a carbon black pigment.

24. The water-based pigmented ink of claim 22 wherein the yellow pigment comprises a nickel azo pigment.

25. The water-based pigmented ink of claim 22 wherein the cyan pigment comprises a copper phthalocyanate pigment.

26. The water-based pigmented ink of claim 22 wherein the magenta pigment comprises a quinacridone pigment.

* * * * *

UNITED STATES PATENT AND TRADEMARK OFFICE
CERTIFICATE OF CORRECTION

PATENT NO. : 6,262,207 B1
DATED : July 17, 2001
INVENTOR(S) : Prabhakara Satyauolu Rao, Ahmed Salih Abuelyaman, and Babu N. Gaddam It is certified that error appears in the above-identified patent and that said Letters Patent is hereby corrected as shown below:

Column 2,
Line 31, "multifinctional" should read -- multifunctional --
Line 44, "multifinctional" should read -- multifunctional --

Column 4,
Line 33, "propanesulforicl" should read -- propanesulfonic --
Line 37, "isobomyl" should read -- isobornyl --

Column 5,
Line 49, "isobomyl" should read -- isobornyl --

Column 7,
Line 9, "firther" should read -- further --
Line 55, "ajet, and thejet" should read -- a jet, and the jet --

Column 8,
Line 52, "inldet" should read -- inkjet --
Line 63, "isobomyl" should read -- isobornyl --

Column 11,
Line 26, "functionality" should read -- functionality --
Line 60, "wann" should read -- warm --

Column 12,
Line 27, "Exapmle" should read -- Example --

Column 13,
Line 44, "unifonn" should read -- uniform --
Line 67, "150 mn." should read -- 150 nm. --

UNITED STATES PATENT AND TRADEMARK OFFICE
CERTIFICATE OF CORRECTION

PATENT NO. : 6,262,207 B1
DATED : July 17, 2001
INVENTOR(S) : Prabhakara Satyauolu Rao, Ahmed Salih Abuelyaman, and Babu N. Gaddam It is certified that error appears in the above-identified patent and that said Letters Patent is hereby corrected as shown below:

Column 14,
Line 32, "printer to onto a" should read -- printer onto a --

Column 15,
Line 26, "NN-dimethyl" should read -- N,N-dimethyl --
Line 38, "isobomyl" should read -- isobornyl --

Column 16,
Line 24, "firther" should read -- further --

Signed and Sealed this

Nineteenth Day of March, 2002

Attest:

JAMES E. ROGAN
*Director of the United States Patent and Trademark Office*

*Attesting Officer*